Dec. 15, 1970

AKIO NOGUCHI 3,546,979

APPARATUS FOR BALANCING A HEADSTOCK AND
A SADDLE IN MACHINE TOOLS

Filed June 28, 1968

INVENTOR.
AKIO NOGUCHI

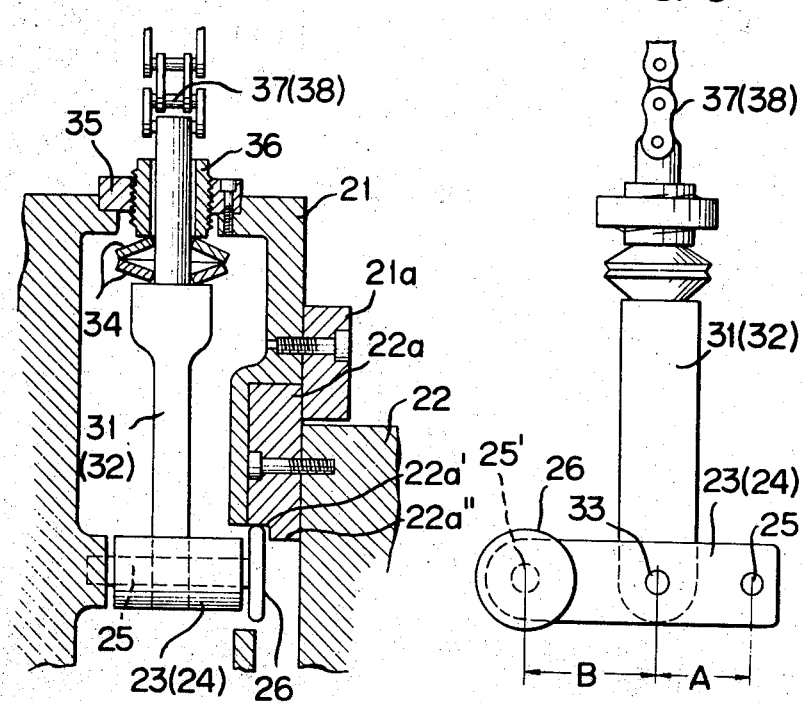

United States Patent Office 3,546,979
Patented Dec. 15, 1970

3,546,979
APPARATUS FOR BALANCING A HEADSTOCK AND A SADDLE IN MACHINE TOOLS
Akio Noguchi, Hiroshima-shi, Japan, assignor to Mitsubishi Jukogyo Kabushiki Kaisha, Tokyo, Japan
Filed June 28, 1968, Ser. No. 740,901
Int. Cl. B23b 47/26
U.S. Cl. 77—36                                9 Claims

ABSTRACT OF THE DISCLOSURE

In a machine tool, such as a milling or boring machine, including a vertically displaceable and guided saddle and a headstock supported by the saddle for lateral displacement and operatively associated with a spindle, balancing apparatus for the saddle and headstock includes first, second and third tension elements, such as cords, ropes, or chains, connected at first ends to the saddle and headstock combination and connected at second ends to a balancing counterweight. The first ends of the first and second cords are connected to points on the saddle which are equidistant laterally, in opposite directions, from the vertical center line of the saddle and their second ends are connected to points on the counterweight which are equidistant laterally, in opposite directions, from the vertical center line of the counterweight. The first end of the third tension element passes through a fixed point of the saddle which fixed point is spaced, in the direction of projection of the headstock, forwardly of the combined center of gravity of the saddle and the headstock and forwardly of the center of gravity of the headstock. This first end of the third tension element is connected to a roller engaging beneath an inclined or sloping surface on the headstock, so that the roller is vertically displaced upon projection and retraction of the head stock relative to the saddle. The second end of the third tension element is connected to a point at the center of gravity of the counterweight. Weight adjusting means may be included either in the first and second tension elements or in the third tension element. The first and second tension elements may be connected to levers pivoted on the saddle and carrying, at their free ends, rollers engaging beneath a horizontal surface on the headstock.

BACKGROUND OF THE INVENTION

In conventional machine tools, where ropes or chains are used for reducing the weight of a vertically displaceable saddle, disadvantages are experienced. For instance, the saddle is apt to tilt when a headstock movably supported thereby is shifted laterally. In some cases, the saddle tilts when the headstock is displaced. Furthermore, the mechanisms become complicated and therefore are not convenient of operation. The headstock is also inclined to tilt in some directions.

SUMMARY OF THE INVENTION

This invention relates to apparatus for balancing a saddle and a headstock in machine tools and, more particularly, to a novel and improved such balancing apparatus which always maintains the saddle and the headstock in an equilibrium.

An object of the present invention is to overcome the mentioned above disadvantages.

Another object of the present invention is to provide that, wherever a headstock is moved, the headstock and a supporting saddle are kept in an equilibrium and that a distortion of a sliding surface of a column is prevented.

A further object of the present invention is to reduce the weight of the headstock supported by the saddle and to reduce the frictional resistance between them.

A still further object of the present invention is to make the saddle simple in construction and further to provide a single counterweight so that the whole apparatus may be simple in construction.

In accordance with the present invention, a vertically displaceable saddle supports a headstock for lateral movement so that the headstock may be shifted in the direction of a spindle operatively associated with the headstock, the spindle extending substantially horizontally of the headstock. A counterweight is used to balance the weight of the headstock and the saddle, and first and second tension elements are connected at one end to the counterweight and the other end to lifting points common to the headstock and the saddle. A third tension element is secured at one end to the counterweight and at its other end has lifting engagement with the headstock.

The points of attachment of the three tension elements are at respective positions in which the saddle and the headstock are maintained in an equilibrium by the first and second tension elements which can, under load, fluctuate so as to absorb the load fluctuations of the third tension element and which lateral fluctuation results from lateral shifting of the headstock in the saddle.

For an understanding of the principles of the invention, reference is made to the following description of typical embodiments thereof as illustrated in the accompanying drawings.

BRIEF DESCRIPTION OF THE DRAWINGS

In the drawings:

FIG. 7 is a vertical sectional view showing essential parts of the apparatus shown in FIG. 6;

FIG. 8 is a front elevation view of these essential parts; and

FIG. 9 is a front elevation view of other essential parts of the apparatus.

DESCRIPTION OF THE PREFERRED EMBODIMENTS

Figure 1:
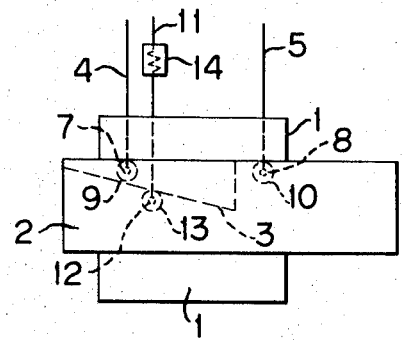
FIG. 1 is a front elevation view showing a first embodiment of the present invention.

Referring to FIGS. 1 to 4, in which an embodiment is illustrated, 1 indicates a saddle, and 2 a headstock which is supported to be slidably shifted in the spindle direction on the saddle 1 and which is provided with an inclined surface 3 in the interior. 4 indicates a first tension element, such as a chain or rope.

A second tension element, such as a chain or rope, is indicated at 5, and a counterweight is indicated at 6. 7 indicates a horizontal lever operatively associated with the first tension element 4, and a horizontal lever operatively associated with the second tension element 5 is indicated at 8. A roller 9 is rotatably mounted at one of 7, lever and the other end of lever 7 is pivoted on saddle 1. A roller 10 is rotatably mounted at one end of lever 8, and the other end of lever 8 is pivotally mounted on saddle 1.

A third tension element 11, such as a chain or rope, has one end secured to the upper surface of counterweight 6 directly above its center of gravity $G_W$, and its other end is connected to a horizontal lever 12. A roller 13 is rotatably mounted at one end of lever 12, and lever 12 is pivotally mounted, at its other end, on saddle 1.

Figure 5:
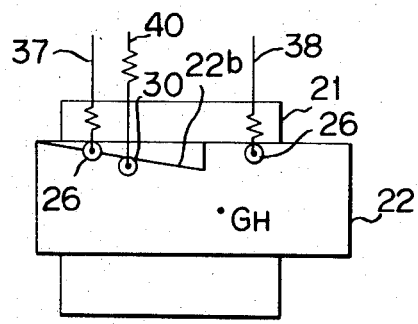
FIG. 5 is a front elevation view showing a second embodiment of the present invention.
Figure 6:
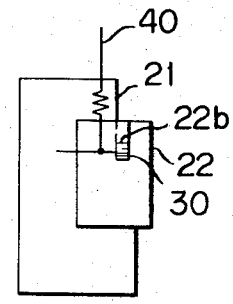
FIG. 6 is a side elevation view of the balancing apparatus shown in FIG. 6.

The first and the second tension elements or cords 4 and 5 are respectively, at one end, fixed at points P$a$ and P$b$ which are on the upper side of the counterweight 6 and spaced from the center of gravity G$_W$ by distances $a$ and $b$ respectively (FIG. 5). The other end of each tension element 4 and 5 is fixed at a respective point P$_A$ or P$_B$ which is spaced a distance A or B from the common center of gravity G of both the saddle 1 and the headstock 2 in the limiting retracted position of the headstock 2. In this case, the rollers 9 and 10, not fixed to the levers 7 and 8 but provided directly on the saddle 1, are in contact with a horizontal sliding surface of the headstock 2. In some cases, however, the rollers 9 and 10 are fixed at the free ends of the levers 7 and 8, respectively, which latter are secured to the lower ends of the tension elements 4 and 5 passing through the points P$_A$ and P$_B$ respectively. The lower ends of the tension elements are determined so that the rollers 9 and 10 may come in contact with the horizontal sliding surface of the headstock 2.

The lower end of the third tension element 11, which passes through a fixed point P$_H$ (FIG. 4) is determined so that the roller 13 may come in contact with the inclined surface 3. The lower end of the third tension element 11 extends to the point P$_H$ in the limiting retracted position of the headstock 2, when the third tension element is subject to no load. This means the fixed point. In some cases, the lower end of the third tension element may be directly in contact with the inclined surface 3. It is to be pointed out that the lower end of the third tension element 11 passing through the fixed point can be, in any cases, raised or lowered acconding to how the headstock 2 is shifted laterally.

It is desirable that the above-mentioned distances A, B, $a$ and $b$ have the following relation $B/A = b/a = 1$. But this relation may be somewhat different due to weight distribution in constituent parts of the saddle 1 and the headstock 2, or due to function and operation. It is further necessary that the roller 13 lifting the headstock 2, or the point P$_H$ is positioned forwardly of the center of gravity G$_H$ of the headstock 2, which varies.

Figure 2:
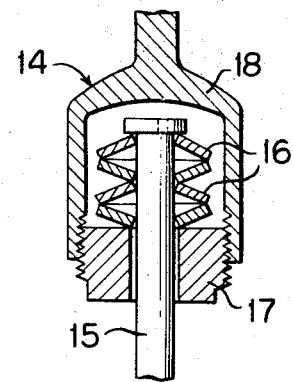
FIG. 2 is an enlarged vertical sectional view of a balancing apparatus shown in FIG. 2.
Figure 3:
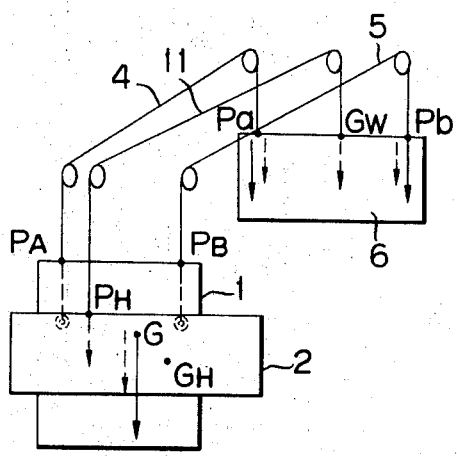
FIGS. 3 and 4 are explanatory views showing the balancing apparatus in operation.

Referring to FIG. 2, 14 indicates a weight adjusting device, consisting of a rod 15, an elliptic spring 16, an adjusting screw 17 and a bracket 18, is fixed at a proper position on the third tension element 11. If accessories are attached to the nose of the headstock 2, then the center of gravity thereof varies. But, the variation, or an additional weight at the point P$_H$, is balanced by shifting the adjusting screw 17 to a position which is determined dependent on load characteristics of the spring 16. Thereby, the headstock can be kept in an equilibrium.

Figure 4:
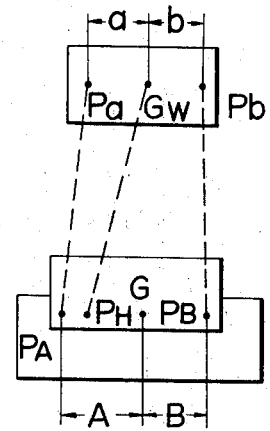

Assuming that the headstock 2 is at its limiting retracted position, the fixing points of the first and the second tension elements 4 and 5 being in the relation of $B/A = b/a$ are subject to loads which are shown by arrows (full lines) in FIG. 4. Thereby, tne third tension element 11 is subject to no load, while the saddle 1 and the headstock 2 are kept in an equilibrium.

If the headstock 2 is shifted or advanced, then the roller 13 is drawn down aong the inclined surface 3 inside the headstock, while the elliptic spring 16 is compressed through the rod 15. This causes tension to be exerted on the third tension element 11. Thereby, the center of gravity G$_W$ of the couterweight 6 is raised, due to the increase of weight at the point P$_H$ corresponding with the shifting of the headstock 2. Accordingly, loads at the points P$a$ and P$b$ are decreased an equal amount and this decrease will absorb the increase of weight to cause a force lifting the headstock 2, as shown by arrows (dash lines) in FIG. 4. Consequently, the headstock 2 is not displaced vertically displaced, while the center of gravity G of the assembled unit of the saddle 1 and the headstock 2 is kept at a fixed vertical position. The saddle 1 is also in the balanced condition.

FIGS. 5-9 illustrate another embodiment of the invention in which the saddle is indicated at 21 as having fixed thereto a guide member 21$a$ for a headstock 22 having a sliding part 22$a$ secured thereto. Sliding part 22$a$ has a horizontal rolling surface 22$a'$ formed with a wide part 22$a''$. An inclined rolling surface on headstock 22 is indicated at 22$b$ in FIG. 5.

First and second lifting levers individually pivoted on respective shafts 25 and 25$'$ on saddle 21 are illustrated at 23 and 24, respectively, and the free end of each lever rotatably supports a roller in engagement with horizontal rolling surface 22$a'$. A third lifting lever 27 is pivoted on a shaft 28 on saddle 21, forwardly of the center of gravity G$_H$ of the headstock (FIG. 5), and a shaft 29 at the free end of lever 27 rotatably supports a roller 30 which is engaged beneath inclined surface 22$b$.

Lifting rods 31 and 32 are pivoted, by means of pins 33, on the first and second lifting lever 23 and 24, respectively, and elliptic springs 34 are inserted between rods 31 and 32 and adjusting screws 36 mounted in covers or closure elements 35 of saddle 21. The first and second tension elements 38 have their lower ends secured to the upper ends of the respective lifting rods 31 and 32, and their other ends are secured to the counterweight which has not been shown in this embodiment of the invention. The adjusting screws 36 can be turned so that loads exerted on the rollers 26 may be adjusted.

Further, 39 indicates a lifting rod pivoted on a shaft (not shown) provided at the fore end of the third lifting lever 27 and 40 the third tension element (chain or rope) which is, at its lower end, fixed at the upper end of the lifting rod 39 and, at the other end, fixed at a point directly above the center of gravity of the counterweight.

The points fixing the lifting rods 31 and 32 to the lifting levers 23 and 24 are determined respectively on the basis of the ratio, in weight, of the headstock 22 to the saddle 21. Normally, the load ratio of the rollers 26 is fixed at a proper value in the range of 30% to 80% of the weight of the headstock 22. The relative positions of the rollers 26 and 30 do not vary in the spindle direction, but the rollers 26 and 30 have to be in contact with the rolling surfaces 22$a'$ and 22$b$ at points where the headstock 22 and the saddle 21 are lifted in the balanced condition by the first and the second lifting levers 23 and 24 at the limiting retracted position of the headstock 22, and where at a projected position thereof, the additional weight of the headstock corresponding with the amount of its advance is lifted by the third lifting lever 27 and at the same time half of the force causing this lifting is balanced by each of the lifting levers 23 and 24. Thereby, the headstock 22 and the saddle 21 are lifted still in the balanced condition.

Assuming that the headstock 22 is at the same limiting retracted posiiton, the lifting levers 23 and 24 as well as the first and the second tension elements 37 and 38 keep the saddle 21 and the headstock 22 in an equilibrium. The third tension element 40, or the lifting lever 27, is subject to no load.

If the headstock 22 is shifted or projected, then the roller 30 is pushed down along the inclined surface 22$b$ and the third tension element 40 is pulled through the lifting rod 39. Thereby, the counterweight is lifted, at the contact point between the roller 30 and the inclined surface 22$b$, due to the increase of weight corresponding with the amount of the shifting of the headstock 22. Accordingly, the lifting forces of the first and the second tension elements 37 and 38 are equally decreased and this decrease will absorb the increase of weight to cause a force lifting the headstock 22. As a result, the headstock 22 is not displaced vertically and the center of gravity G of the assembled unit of the saddle 21 and the headstock 22 is kept at a fixed position. The saddle 21 is also in the balanced condition.

In shifting the headstock 22, the lifting force of the first tension element 37 or the second tension element 38 is divided at the ratio of $B/A$ (FIG. 9) so that the saddle 21 and the headstock 22 may be lifted. Accordingly, the weight of the headstock 22 applied to the saddle 21 can be reduced and therefore the frictional resistance during the shifting can also be reduced. Further, the weight to be borne by the saddle alone can be reduced since the saddle 21 is lifted too.

In the illustrated embodiments, the shifting of the headstock relative to the saddle is performed in the spindle direction. But it is to be noted that the present invention is not limited to said embodiments. This, the present invention can be applied to machine tools in which a ram is shifted relatively to a saddle in the spindle direction.

It is to be understood that various modifications of the present invention may be made without departing from the spirit and scope thereof.

What is claimed is:

1. In a machine tool including a vertically displaceable saddle and a headstock operatively connected to a spindle and supported in the saddle for lateral displacement, substantially parallel to the spindle axis, between a limiting retracting position and a laterally projecting position, balancing apparatus for the saddle and headstock comprising, in combination, a counterweight mounted for vertical displacement to at least partially balance the weight of said saddle headstock; first and second tension elements each having one end connected to a respective first point on said counterweight and an opposite end connected to a respective second point which is a common lifting point for both said saddle and said headstock; said first points being spaced substantially equal distances laterally, and in opposite directions, from the center of gravity of said counterweight, and said second points being spaced substantially equal distances laterally, and in opposite directions, from the vertical center line of said saddle; and a third tension element having one end connected to a third point on said counterweight vertically aligned with the center of gravity of said counterweight and its opposite end in supporting engagement with only said headstock at a fourth point which is spaced laterally from the center of gravity of said headstock and from the vertical center line of said saddle in the direction of lateral projection of said headstock a distance such that load variations on said third tension element, due to lateral shifting of said headstock, are absorbed by subjection of said first and second tension elements to corresponding load variations so that said saddle and said headstock are maintained in an equilibrium.

2. In a machine tool, balancing apparatus, as claimed in claim 1, including respective first rollers connected to the opposite ends of said first and second tension elements and engaged beneath a common supporting surface of said saddle and said headstock; and a second roller connected to the opposite end of said third tension element and engaged beneath another supporting surface which is respectively restricted to said headstock.

3. In a machine tool, balancing apparatus, as claimed in claim 2, in which said another supporting surface is inclined upwardly in the direction of projection of said headstock whereby, said headstock is projected, the load on said third tension element is increased.

4. In a machine tool, balancing apparatus, as claimed in claim 1, including a weight adjusting device incorporated in at least one of said tension elements.

5. In a machine tool, balancing apparatus, as claimed in claim 4, in which said weight adjusting device is incorporated in said third tension element.

6. In a machine tool, balancing apparatus, as claimed in claim 4, in which a respective weight adjusting device is incorporated in each of said first and second tension elements.

7. In a machine tool, balancing apparatus, as claimed in claim 1, in which said headstock has a first horizontally extending rolling surface and a second rolling surface which is inclined upwardly in the direction of projection of said headstock; respective first rollers engaged beneath said first rolling surface and each connected to the opposite end of a respective first and second tension element; and a third roller engaged beneath said second rolling surface and connected to the opposite end of said third tension element.

8. In a machine tool, balancing apparatus, as claimed in claim 7, in which each roller is rotatably mounted at the free end of a respective lever pivotally mounted on said saddle; each tension element being connected to a respective lever intermediate the ends of the latter.

9. In a machine tool, balancing apparatus, as claimed in claim 8, including weight adjusting devices each incorporated in a respective one of said first and second tension elements and positioned between a surface on the respective tension element and an adjusting element threaded into said saddle.

References Cited
FOREIGN PATENTS
885,426  12/1961  Great Britain _____ 77—36

FRANCIS S. HUSAR, Primary Examiner